United States Patent
Fortini et al.

(10) Patent No.: US 9,430,808 B2
(45) Date of Patent: Aug. 30, 2016

(54) SYNCHRONIZATION POINTS FOR STATE INFORMATION

(71) Applicant: Microsoft Technology Licensing, LLC, Redmond, WA (US)

(72) Inventors: Christian Fortini, Sammamish, WA (US); Brian E. Manthos, Sammamish, WA (US); Grant A. Watters, Seattle, WA (US); Li-Hsin Huang, Redmond, WA (US); Richard K. James, Redmond, WA (US); Samuel R. Fortiner, Woodinville, WA (US); R. Scott Briggs, Redmond, WA (US); Sergey Z. Malkin, Redmond, WA (US); Yuanzhe Wang, Redmond, WA (US); Rico Mariani, Redmond, WA (US); Justin E. Rogers, Redmond, WA (US); Anjali S. Parikh, Redmond, WA (US); Praveen Kumar Muralidhar Rao, Sammamish, WA (US); Matthew P. Kotsenas, Seattle, WA (US); Jason J. Weber, Medina, WA (US); Nirankush Panchbhai, Redmond, WA (US); Rossen Atanassov, Bellevue, WA (US); Peter Salas, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 442 days.

(21) Appl. No.: 13/921,727

(22) Filed: Jun. 19, 2013

(65) Prior Publication Data

US 2014/0375657 A1 Dec. 25, 2014

(51) Int. Cl.
*G06F 9/52* (2006.01)
*G06T 1/20* (2006.01)
(Continued)

(52) U.S. Cl.
CPC ............... *G06T 1/20* (2013.01); *G06F 9/4443* (2013.01); *G06F 9/52* (2013.01); *G06F 9/542* (2013.01); *G06T 15/005* (2013.01); *G05B 2219/23258* (2013.01); *G06F 2209/545* (2013.01)

(58) Field of Classification Search
None
See application file for complete search history.

(56) References Cited

U.S. PATENT DOCUMENTS

| 7,228,500 B2 | 6/2007 | Calvert et al. |
| 7,426,735 B2 * | 9/2008 | Bliss ..................... G06F 9/4443 710/240 |

(Continued)

FOREIGN PATENT DOCUMENTS

EP 2584463 A2 4/2013

OTHER PUBLICATIONS

"Independent Composition: Rendering and Compositing in Internet Explorer 10", Retrieved at <<http://msdn.microsoft.com/en-us/library/ie/jj680148(v=vs.85).aspx>>, Nov. 27, 2012, pp. 12.

(Continued)

*Primary Examiner* — Joni Richer
(74) *Attorney, Agent, or Firm* — Bryan Webster; Judy Yee; Micky Minhas

(57) ABSTRACT

Techniques for synchronization points for state information are described. In at least some embodiments, synchronization points are employed to propagate state information among different processing threads. A synchronization point, for example, can be employed to propagate state information among different independently-executing threads. Accordingly, in at least some embodiments, synchronization points serve as inter-thread communications among different independently-executing threads.

20 Claims, 9 Drawing Sheets

(51) Int. Cl.
    *G06F 9/44*         (2006.01)
    *G06T 15/00*        (2011.01)
    *G06F 9/54*         (2006.01)

(56) References Cited

U.S. PATENT DOCUMENTS

| | | | |
|---|---|---|---|
| 8,020,089 B1 | 9/2011 | Brichford et al. | |
| 2003/0063627 A1* | 4/2003 | Toshitani | H04J 3/0632 370/503 |
| 2005/0278059 A1* | 12/2005 | Osborn | G05B 19/0426 700/181 |
| 2007/0139430 A1 | 6/2007 | Korn et al. | |
| 2009/0204666 A1 | 8/2009 | Sana et al. | |
| 2009/0300656 A1 | 12/2009 | Bosworth et al. | |
| 2010/0141678 A1 | 6/2010 | Abdo et al. | |
| 2010/0164983 A1 | 7/2010 | Lawrence et al. | |
| 2010/0251167 A1* | 9/2010 | DeLuca | G06F 3/0485 715/786 |
| 2010/0262710 A1 | 10/2010 | Khatib et al. | |
| 2010/0287553 A1 | 11/2010 | Schmidt et al. | |
| 2011/0063313 A1* | 3/2011 | Bolz | G06T 15/005 345/531 |
| 2011/0298787 A1 | 12/2011 | Feies et al. | |
| 2012/0151408 A1 | 6/2012 | Groth et al. | |
| 2012/0159363 A1 | 6/2012 | DeBacker et al. | |
| 2012/0174121 A1 | 7/2012 | Treat et al. | |
| 2012/0260181 A1 | 10/2012 | Sule et al. | |
| 2013/0021360 A1 | 1/2013 | Gruber | |
| 2013/0097534 A1 | 4/2013 | Lewin et al. | |
| 2014/0129966 A1 | 5/2014 | Kolesnikov et al. | |
| 2014/0157108 A1 | 6/2014 | Schmidt et al. | |
| 2014/0368515 A1 | 12/2014 | Fortini et al. | |

OTHER PUBLICATIONS

"Mozilla/Servo—Design", Retrieved at <<https://github.com/mozilla/servo/wiki/Design>>, Retrieved Date: Dec. 21, 2012, pp. 5.

"Direct Manipulation", Retrieved at <<http://msdn.microsoft.com/en-us/library/windows/desktop/hh446969(v=vs.85).aspx>>, Oct. 27, 2012 pp. 6.

"WebSphere Notes", Retrieved at <<http://wpcertification.blogspot.in/2008/10/parallel-rendering-of-portlet.html>>, Oct. 2008, pp. 3.

"International Search Report & Written Opinion for PCT Patent Application No. PCT/US2013/061060", Mailed Date: Feb. 27, 2014, Filed Date: Sep. 20, 2013, 11 Pages.

"Final Office Action", U.S. Appl. No. 13/918,825, Jan. 25, 2016, 27 pages.

"International Search Report and Written Opinion", Application No. PCT/US2013/060756, Mar. 18, 2014, 12 pages.

"Non-Final Office Action", U.S. Appl. No. 13/918,825, Jul. 22, 2015, 20 pages.

"WebCL—Heterogeneous Parallel Computing in HTML5 Web Browsers", Retrieved from <http://www.khronos.org/webcl/> on Apr. 11, 2013, Aug. 9, 2011, 2 pages.

Garsiel,"How Browsers Work: Behind the scenes of modern web browsers", Retrieved from: <<http://www.html5rocks.com/en/tutorials/internals/howbrowserswork/>>, Aug. 5, 2011, 61 pages.

Jones, "Parallelizing the Web Browser", In Proceedings of the First USENIX Conference on Hot Topics in Parallelism, Mar. 30, 2009, 6 pages.

Jones-Bey,"Getting Started With the WebKit Layout Code", Retrieved from <http://blogs.adobe.com/webplatform/2013/01/21/getting-started-with-the-webkit-layout-code/> on Apr. 11, 2013, Jan. 21, 2013, 5 pages.

Lee,"Parallelizing Canvas Rendering", Retrieved from: <<http://www.dorothybrowser.com/parallelizing-canvas-rendering/>>, Sep. 23, 2011, 4 pages.

Mai,"A Case for Parallelizing Web Pages", In Proceedings of the 4th USENIX Workshop on Hot Topics in Parallelism, Available at <http://web.engr.illinois.edu/~mai4/pubs/adrenaline-hotpar12-paper.pdf>, Jun. 7, 2012, 6 pages.

McMullen,"Graphics on Web Platforms for Complex Systems Modelling and Simulation", In Proceedings of the International Conference on Computer Graphics and Virtual Reality, Available at <http://www.massey.ac.nz/~kahawick/cstn/157/cstn-157.pdf>, Apr. 2012, 9 pages.

Rousset,"Introduction to HTML5 Web Workers: The JavaScript Multi-Threading Approach", Retrieved from <http://www.codeproject.com/Articles/271571/Introduction-to-HTML5-Web-Workers-The-JavaScript-M> on Apr. 11, 2013, Apr. 3, 2012, 12 pages.

Non-Final Office Action, U.S. Appl. No. 13/918,825, Jun. 30, 2016, 29 pages.

* cited by examiner

SYNCHRONIZATION POINTS FOR STATE INFORMATION

BACKGROUND

Today's computing devices have an ever-increasing amount of processing power. For example, a typical device has a central processing unit (CPU) with multiple processing cores that can each perform data processing. Further, the number of cores available on individual processors continues to increase. With the prevalence of multi-core processors comes the ability to perform multiple processing tasks on a CPU in parallel. For example, multiple processing threads that each handles a particular processing task can execute at the same time on respective cores of a processor. Thus, the speed with which multiple tasks can be completed is increased over previous single-core processors.

While available processing power has increased, many computing processes still utilize a serial processing approach for scheduling and/or managing processing tasks. For example, some applications are not configured to parallelize certain processing tasks, and thus do not leverage the parallel processing capabilities of multi-core processors. By not parallelizing processing tasks, these processes do not receive the performance benefits that result from parallel processing.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for synchronization points for state information are described. In at least some embodiments, synchronization points are employed to propagate state information among different processing threads. A synchronization point, for example, can be employed to propagate state information among different independently-executing threads. Accordingly, in at least some embodiments, synchronization points serve as inter-thread communications among different independently-executing threads.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Techniques for synchronization points for state information are described. In at least some embodiments, synchronization points are employed to propagate state information among different processing threads. A synchronization point, for example, can be employed to propagate state information among different independently executing threads.

For instance, consider a scenario where a web browser displays a webpage. Techniques discussed herein can utilize a first thread to perform various processing for the webpage, such as webpage formatting tasks, layout tasks, input processing tasks, and so forth. A second independently-running thread can be employed to perform rendering tasks for the webpage, such as generating pixel data for the webpage and causing the pixel data to be displayed.

Based on processing of visual attributes of the webpage, the first thread can emit a synchronization point that includes visual state information for the webpage. The visual state information, for example, can include changes to a visual state of the webpage, such as movement of graphical elements of the webpage, resizing and/or recoloring of graphical elements, and so forth. After emitting the synchronization point, the first thread may continue performing other processing, such as generating additional synchronization points.

Further to the example scenario, the second thread can retrieve and process the synchronization point emitted by the first thread, and render the webpage based on the state information from the synchronization point. Thus, the first thread is not dependent on the second thread processing the synchronization point, and may perform various other types of processing while the second thread is processing and/or rendering based on the synchronization point.

Accordingly, in at least some embodiments, synchronization points serve as inter-thread communications that enable state information to be propagated among different independently-executing threads.

In the following discussion, an example environment is first described that is operable to employ techniques described herein. Next, a section entitled "Example Implementation Scenarios" describes some example implementation scenarios in accordance with one or more embodiments. Following this, a section entitled "Example Procedures" describes some example methods in accordance with one or more embodiments. Finally, a section entitled "Example System and Device" describes an example system and device that are operable to employ techniques discussed herein in accordance with one or more embodiments.

Having presented an overview of example implementations in accordance with one or more embodiments, consider now an example environment in which example implementations may by employed.

Example Environment

Figure 1:
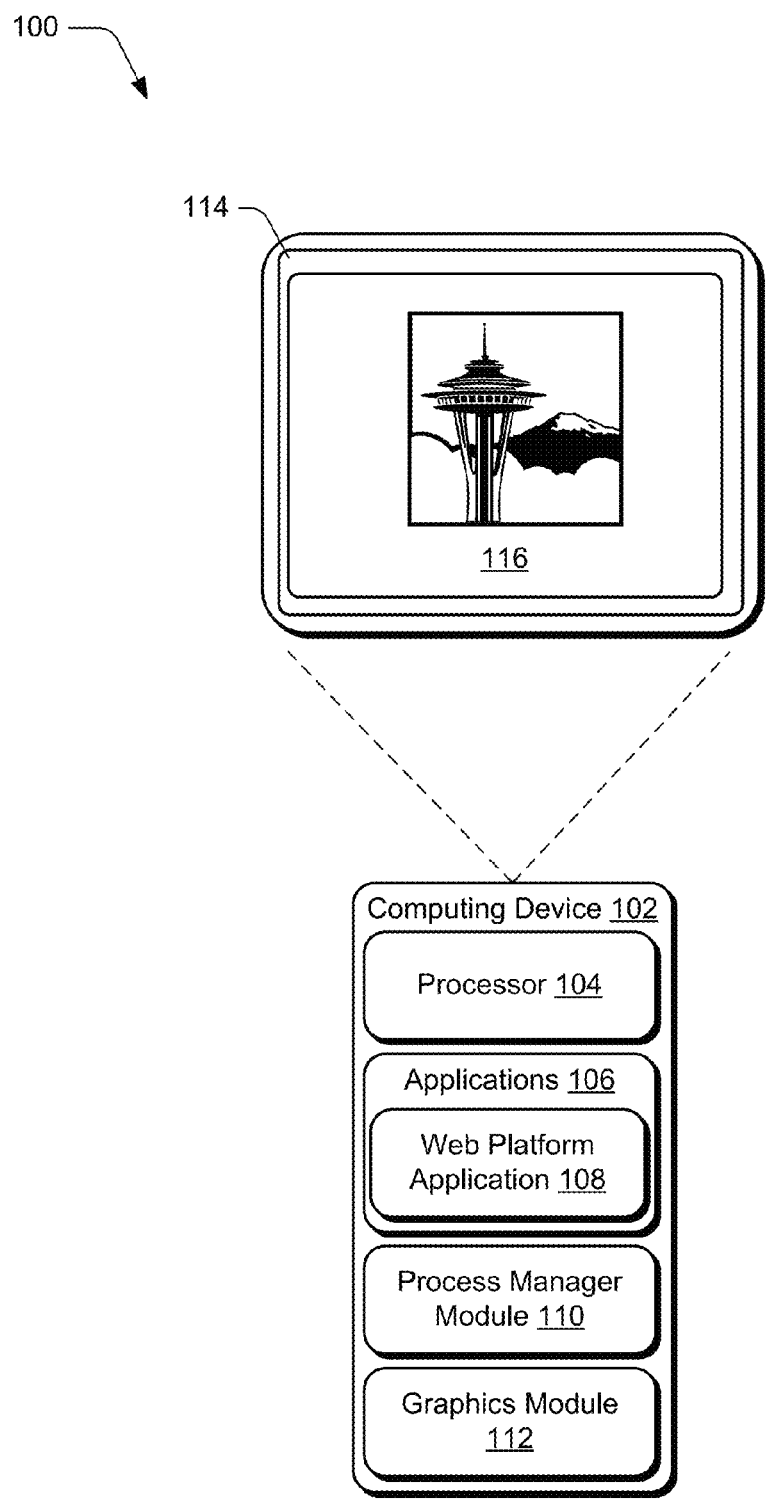
FIG. 1 is an illustration of an environment in an example implementation that is operable to employ techniques discussed herein.

FIG. 1 is an illustration of an environment 100 in an example implementation that is operable to employ techniques for synchronization points for state information described herein. The illustrated environment 100 includes a computing device 102 that may be configured in a variety of ways. For example, the computing device 102 may be configured as a traditional computer (e.g., a desktop personal computer, laptop computer, and so on), a mobile station, an entertainment appliance, a set-top box communicatively coupled to a television, a wireless phone, a netbook, a game console, a handheld device (e.g., a tablet), and so forth as further described in relation to FIG. 9.

Computing device 102 includes a processor 104, which is representative of functionality to perform various types of data processing for the computing device 102. For example, the processor 104 can represent a central processing unit (CPU) of the computing device 102. The processor 104 includes multiple processor cores that are capable of individually performing processing tasks. Thus, the processor 104 is configured to perform parallel processing, such as executing multiple processing threads simultaneously. Further examples of implementations of the processor 104 are discussed below with reference to FIG. 9.

The computing device 102 further includes applications 106, which are representative of functionalities to perform various tasks via the computing device 102. Examples of the applications 106 include a word processor application, an email application, a content editing application, a gaming application, and so on.

The applications 106 include a web platform application 108, which is representative of an application that operates in connection with web content. The web platform application 108, for example, can include and make use of many different types of technologies such as, by way of example and not limitation, uniform resource locators (URLs), Hypertext Transfer Protocol (HTTP), Representational State Transfer (REST), HyperText Markup Language (HTML), Cascading Style Sheets (CSS), JavaScript, Document Object Model (DOM), as well as other technologies. The web platform application 108 can also work with a variety of data formats such as Extensible Application Markup Language (XAML), Extensible Markup Language (XML), JavaScript Object Notation (JSON), and the like. Examples of the web platform application 108 include a web browser, a web application (e.g., "web app"), and so on.

Further illustrated is a process manager module 110, which is representative of functionality to manage various aspects of processing tasks for the computing device 102. A graphics module 112 is also included, which is representative of functionality to perform various graphics-related tasks for the computing device 102. For instance, the graphics module 112 can perform graphics processing, rendering tasks, and so forth. The graphics module 112, for example, can represent a rendering engine for the applications 106, such as the web platform application 108. In at least some embodiments, the process manager module 110 and/or the graphics module 112 can be leveraged to implement techniques for synchronization points for state information discussed herein.

While the process manager module 110 and the graphics module 112 are illustrated as separate from the applications 106, this is not intended to be limiting. The process manager module 110 and/or the graphics module 112, for example, can be implemented as a part and/or extension of the applications 106 such that their respective functionalities can be leveraged by the applications 106. Alternatively or additionally, the process manager module 110 and/or the graphics module 112 can be implemented as part of an operating system of the computing device 102. Further operational aspects of the process manager module 110 and the graphics module 112 are discussed below.

The computing device 102 includes a display device 114, which is configured to output graphics for the computing device 102. Displayed on the display device 114 is a graphical user interface (GUI) 116, which is representative of a GUI associated with one of the applications 106. The GUI 116, for example, can include web content presented via the web platform application 108. For instance, the GUI 116 can represent a web document, such as a webpage. According to one or more embodiments, techniques for synchronization points for state information discussed herein can be employed to perform various processing tasks related to the GUI 116, such as layout processing, input processing, graphics rendering, and so forth.

Having described an example environment in which the techniques described herein may operate, consider now some example implementation scenarios in accordance with one or more embodiments.

Example Implementation Scenarios

The following discussion describes some example implementation scenarios for techniques for synchronization points for state information described herein. The example implementation scenarios may be implemented in the environment 100 of FIG. 1, the system 900 of FIG. 9, and/or any other suitable environment. The scenarios, for example, can represent functionality of the process manager module 110 and/or the graphics module 112. For instance, the processing threads discussed in the different scenarios can be generated and/or maintained by the process manager module 110 and/or the graphics module 112.

Figure 2:
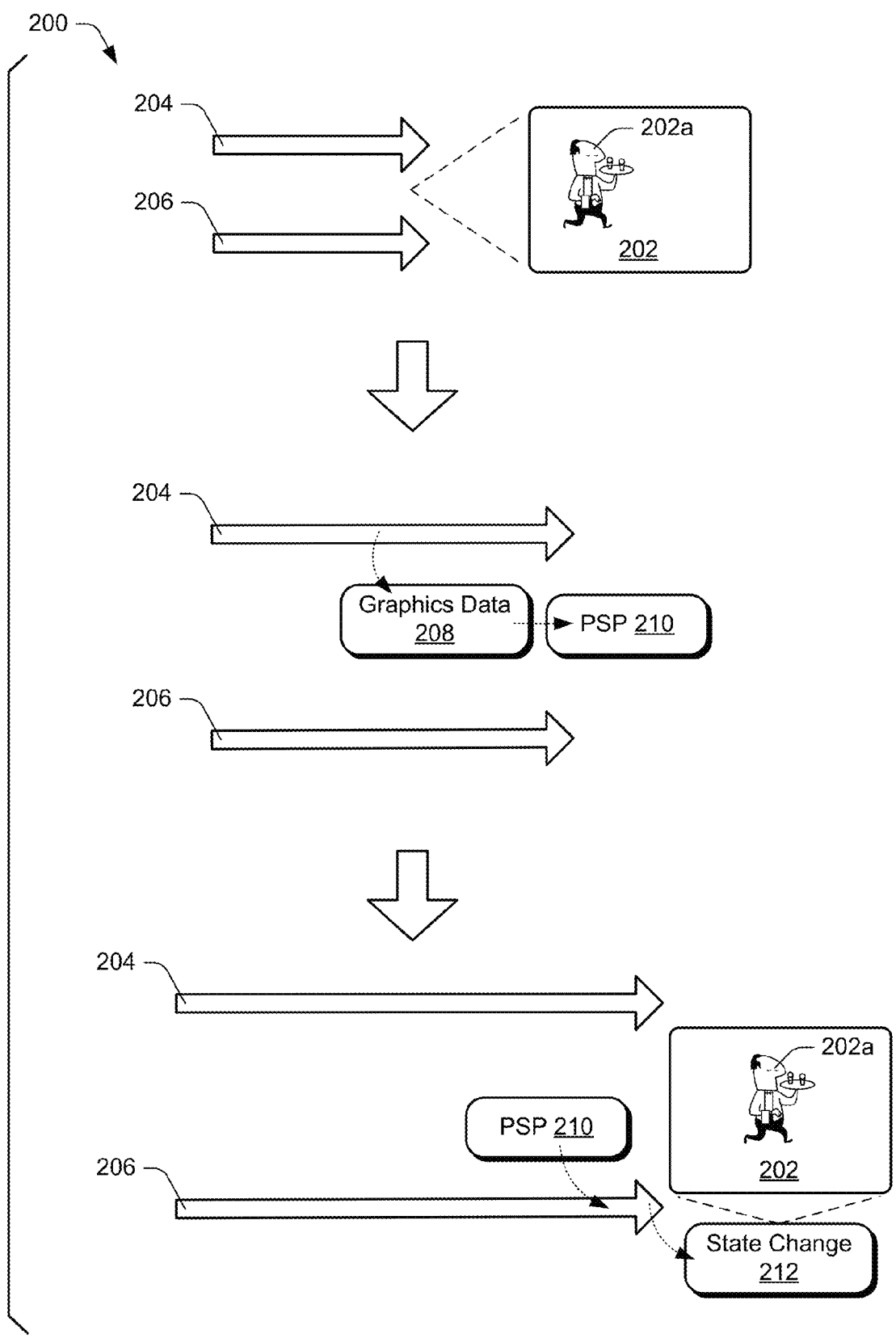
FIG. 2 illustrates an example implementation scenario in accordance with one or more embodiments.

FIG. 2 illustrates an example implementation scenario 200 in accordance with one or more embodiments. The scenario 200 includes a GUI 202, which is representative of various graphical elements that can be displayed. The GUI 202, for example, can represent an implementation of the GUI 116 discussed above with reference to the environment 100. The GUI 202 includes a visual element 202a.

The scenario 200 further includes a primary thread 204 and a render thread 206, which are representative of threads that are employed to perform various processing tasks as part of generating, managing, and rendering the GUI 202.

Generally, the primary thread 204 represents a processing thread that performs various types of management tasks for the GUI 202. Examples of management tasks include generating the GUI 202, such as for one of the applications 106. Other examples of management tasks include executing script (e.g., JScript) for the GUI 202, GUI formatting tasks, GUI layout tasks, DOM manipulations, and so forth. The render thread 206 represents a processing thread that performs rendering operations, such as painting pixels of the GUI 202 to a display. For example, changes to visual aspects of the GUI 202 generated by the primary thread 204 can be rendered for display by the render thread 206. According to various embodiments, the primary thread 204 can pass various graphics information to the render thread 206 for rendering and display.

Proceeding to the center portion of the scenario 200, a change to a visual aspect of the GUI 202 causes the primary thread 204 to generate graphics data 208. The graphics data 208, for example, can describe a change to a visual aspect of the GUI 202. Examples of such changes include color changes, visual element resizing, animation of a visual element, repositioning of a visual element, and so forth. The change, for instance, can occur in response to user interaction with the GUI 202 via various types of user input.

In response to generating the graphics data 208, a paintable synchronization point (PSP) 210 is generated. Generally, the PSP 210 represents a set of information that can be used by the render thread 206 to render portions of the GUI 202. The PSP 210, for example, can include and/or be based on the graphics data 208. Alternatively or additionally, the PSP 210 can include information sufficient to enable the render thread 206 to retrieve the graphics data 208, such as a memory address and/or addresses at which the graphics data 208 resides.

In at least some embodiments, the PSP 210 includes various types of state information for the GUI 202. For example, the PSP 210 can include state change information, such as an indication of visual attributes of the GUI 202 that have changed since a previous PSP was generated and/or a previous render operation was performed by the render thread 206. Thus, according to one or more embodiments, the PSP 210 may not include data for a complete rendering of the GUI 202, but may simply indicate state change information sufficient to update the GUI 202 to a new visual state. This is not intended to be limiting, however, and in at least some embodiments a PSP can represent a complete rendering of a GUI. For instance, embodiments may utilize combinations of partial and complete PSP information to propagate state information.

After emitting the PSP 210, the primary thread 204 may continue processing management tasks for the GUI 202, e.g., without waiting for the render thread 206 to retrieve and/or process the PSP 210.

Proceeding to the lower portion of the scenario 200, the render thread 206 processes the PSP 210 to generate a state change 212. Generally, the state change 212 is a re-render of a portion of the GUI 202 based on state information from the PSP 210. Thus, the state change 212 is applied to the GUI 202 (e.g., as part of a render and/or draw operation) to synchronize a visual state of the GUI 202 with the visual state indicated by the PSP 210. In this particular example, application of the state change 212 causes a repositioning of the visual element 202a, e.g., a translational movement of the visual element 202a within the GUI 202.

Thus, the scenario 200 illustrates that changes to a visual state of a graphical element generated by a first thread can be encapsulated via a PSP that can be consumed by a second thread to apply the changes. Further, the first thread may continue performing other processing tasks after the PSP has been emitted, e.g., without waiting for the PSP to be processed. This provides for efficient usage of processor resources, and increases the overall quality of the user experience by providing a more seamless visual experience. Thus, in at least some embodiments, a PSP provides a mechanism by which state information can be transferred between independent threads.

In at least some embodiments, techniques discussed herein enable multiple PSPs to be generated and processed asynchronously. For instance, consider the following example scenario.

Figure 3:
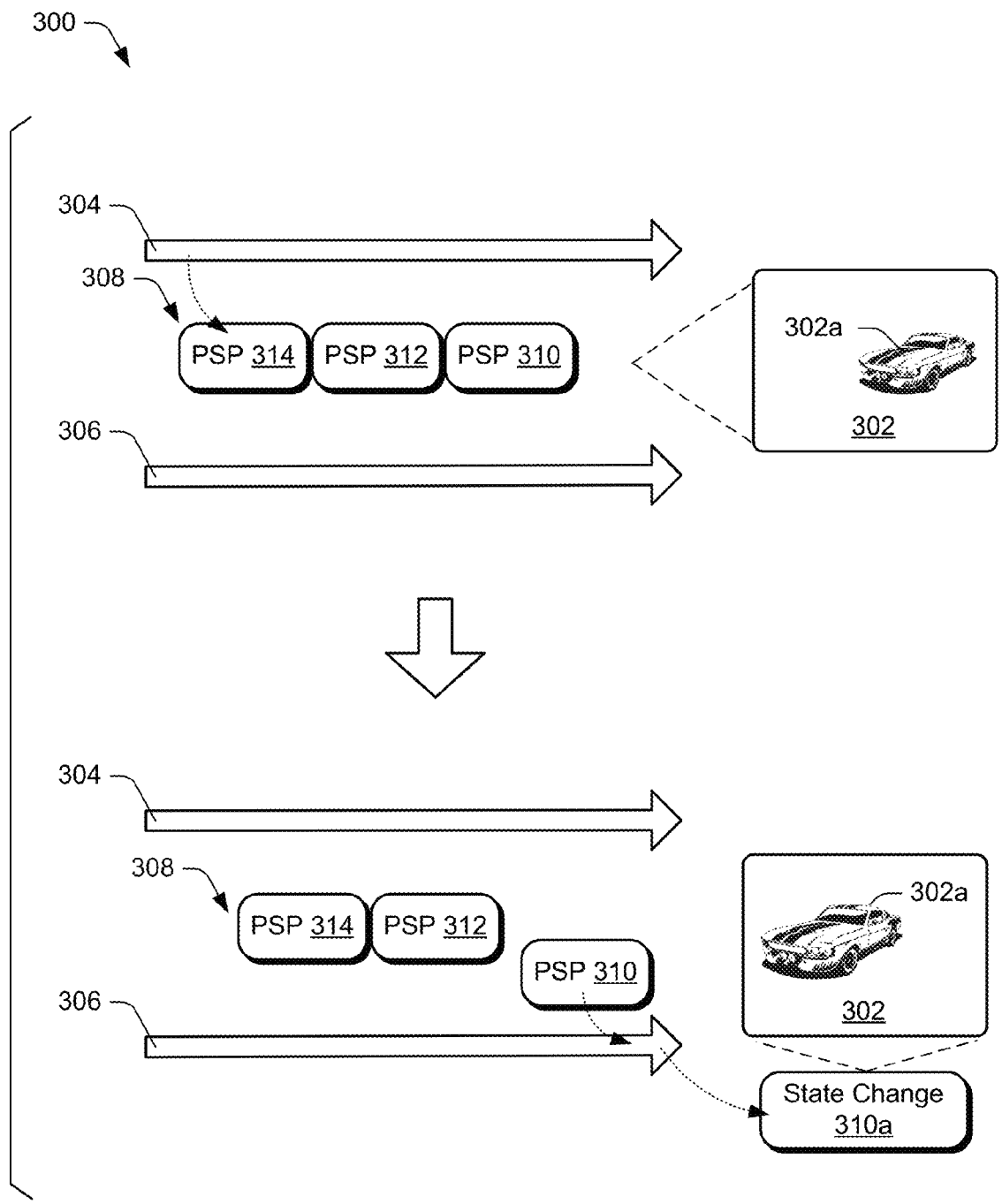
FIG. 3 illustrates an example implementation scenario in accordance with one or more embodiments.

FIG. 3 illustrates an example implementation scenario 300 in accordance with one or more embodiments. The scenario 300 includes a GUI 302, which is representative of various graphical elements that can be displayed. The GUI 302, for example, can represent an implementation of the GUI 116 discussed above with reference to the environment 100. The GUI 302 includes a visual element 302a.

The scenario 300 further includes a primary thread 304 and a render thread 306 for the GUI 302. Example details concerning a primary thread and a render thread are discussed above. Based on visual state changes to the GUI 302, a PSP queue 308 is generated that includes multiple PSPs. For instance, the PSP queue 308 includes a PSP 310, a PSP 312, and a PSP 314 that are generated by the primary thread 304. The PSPs can be generated based on various events, such as user interaction with the GUI 302, events generated by processes, and so forth. As referenced above, the PSPs 310, 312, 314 correspond to changes in a visual state of the GUI 302. For instance, the PSPs 310, 312, 314 can correspond to movement of the visual element 302a in the GUI 302.

In at least some embodiments, PSPs can accumulate in the PSP queue 308 when the PSPs are generated by the primary thread 304 faster than the render thread 306 can process and apply the PSPs. For instance, the render thread 306 may be performing a complex and time-consuming render operation based on a recently consumed PSP such that the primary thread 304 generates additional PSPs before the render thread 306 completes the complex render operation. Thus, PSPs can be queued in a temporally sequential order, with an older PSP placed before a newer one in the queue.

Proceeding to the lower portion of the scenario 300, the render thread 306 retrieves the PSP 310 from the PSP queue 308. The render thread 306 processes the PSP 310 to generate a state change 310a. The state change 310a corresponds to a change in a visual state of the GUI 302. For example, the state change 310a represents a difference between a previous visual state and a current visual state of the GUI 302. Accordingly, in at least some embodiments, the PSP 310 and thus the state change 310a do not represent a complete re-rendering of the GUI 302, but include data that can be applied to update the visual state of a portion of the GUI 302.

The render thread 306 applies the state change 310a to the GUI 302, such as by re-rendering a portion of the GUI. For instance, the render thread 306 can change a visual aspect of the visual element 302a, such as recoloring the visual element, resizing the visual element, and so forth, based on data from the state change 310a generated from the PSP 310. Alternatively or additionally, applying the state change 310a can involve movement of the visual element 302a, such as translation, rotation, and so forth.

In response to the render thread 306 retrieving and processing the PSP 310, the PSPs 312, 314 move up in the PSP queue 308. Thus, after the render thread 306 is finished processing and applying the PSP 310, the render thread 306 can retrieve and process the PSP 312. In at least some embodiments, PSPs are consumed by the render thread 306 from the PSP queue 308 in an order in which they were generated by the primary thread 304 and placed in the queue. Processing of PSPs from the PSP queue 308 can continue until no further PSPs remain to be retrieved in the PSP queue 308, and/or the GUI 302 is closed.

Thus, the primary thread 304 can generate PSPs that represent multiple visual state changes to the GUI 302, and can place them in the PSP queue 308 for subsequent processing by the render thread 306. This enables the primary thread 304 to be available to perform other processing tasks without waiting for the render thread 306 to consume PSPs from the PSP queue 308. Accordingly, the primary thread 304 and the render thread 306 can run independently, with interaction between the threads occurring via PSPs.

In at least some embodiments, techniques discussed herein enable user input to be efficiently processed via a render thread. For instance, consider the following example scenario.

Figure 4:
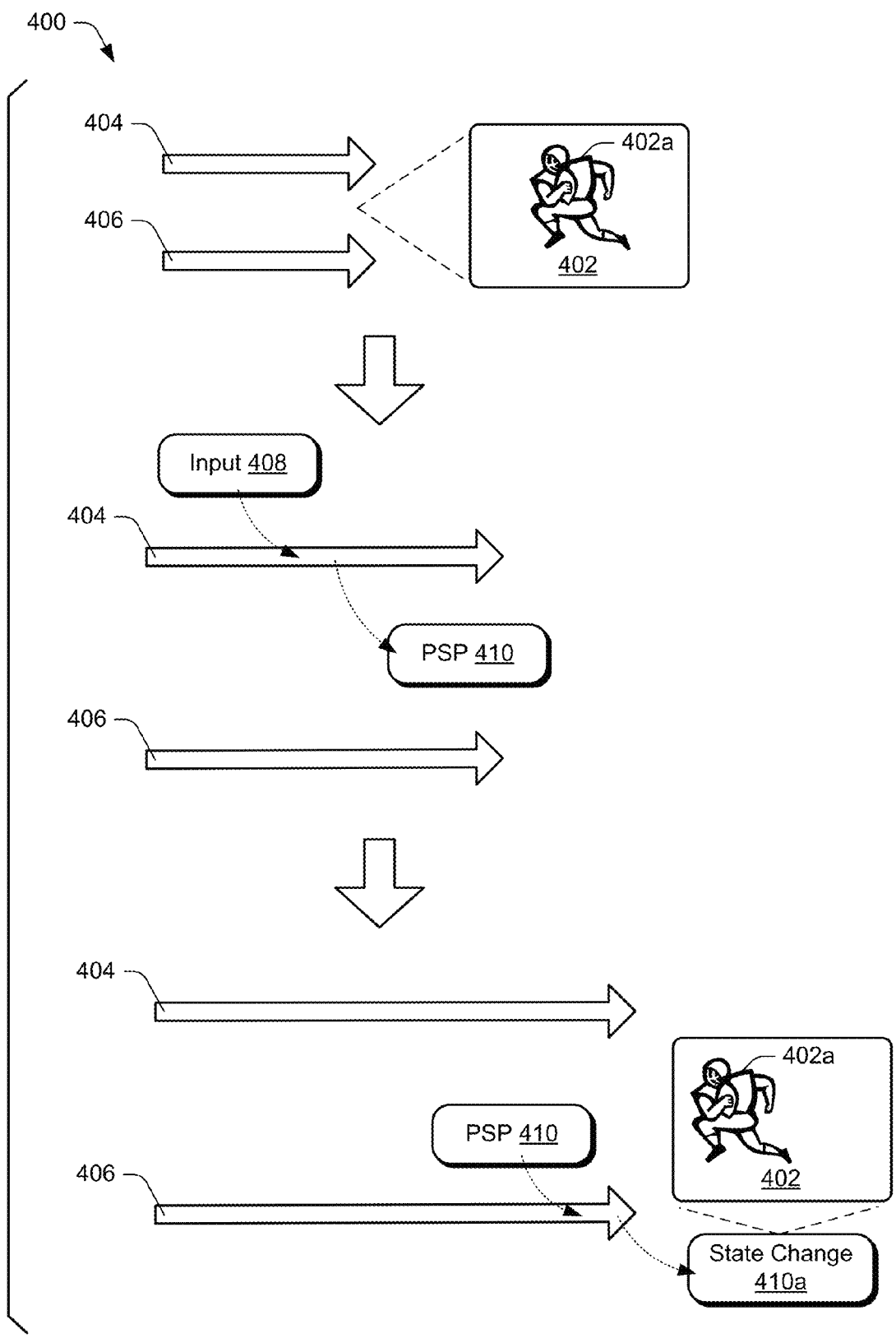
FIG. 4 illustrates an example implementation scenario in accordance with one or more embodiments.

FIG. 4 illustrates an example implementation scenario 400 in accordance with one or more embodiments. The scenario 400 includes a GUI 402, which is representative of various graphical elements that can be displayed. The GUI 402, for example, can represent an implementation of the GUI 116 discussed above with reference to the environment 100. The GUI 402 includes a visual element 402a.

Further illustrated are a primary thread 404 and a render thread 406 for the GUI 402. Details concerning primary threads and render threads are discussed above.

Proceeding to the center portion of the scenario 400, a user provides input 408 to the GUI 402. Examples of the input 408 include touch input, mouse input, keyboard input, voice input, and so forth. In at least some embodiments, the input 408 represents input data received from an input functionality, such as an input device driver.

In response to receiving the input 408, the primary thread 404 processes the input 408 to generate a PSP 410. The PSP 410 represents changes to the GUI 402 based on the input 408. The PSP 410, for example, can indicate various manipulations of the GUI 402. For instance, the PSP 410 can indicate that the GUI 402 is to be scrolled in a display area, a zoom-in or a zoom-out on a portion of the GUI 402, a change to the visual element 402a, and so forth.

Continuing to the lower portion of the scenario 400, the render thread 406 retrieves and processes the PSP 410 to generate a state change 410a for the GUI 402. The state change 410a indicates a re-render of the GUI 402 based on the PSP 410, e.g., based on the input 408. Thus, the render thread 406 renders the GUI 402 based on the input 408. As referenced above, this can include scrolling the GUI 402, zooming on a portion of the GUI 402, panning the GUI 402, and/or other manipulations of portions of the GUI 402.

Thus, once the render thread 406 has obtained data describing a user input (e.g., from a PSP and/or otherwise), the render thread 406 can apply the input to the GUI 402 independent of interaction with the primary thread 404. This enables the primary thread 404 to perform other processing while the input is being applied by the render thread 406, and enables the render thread 406 to actively render the GUI 402 based on the input 408 even if the primary thread 404 is busy with another task.

According to various embodiments, data that describes a visual region of a display (e.g., a GUI) can be represented as a tree structure, or "display tree." Generally, a display tree is a data structure that represents various visual elements of a region of a display. A display tree, for instance, includes different nodes that correspond to respective visual elements of a GUI. As described below, interactions between threads can be characterized via manipulations and versions of a display tree. For instance, consider the following example scenarios.

Figure 5:
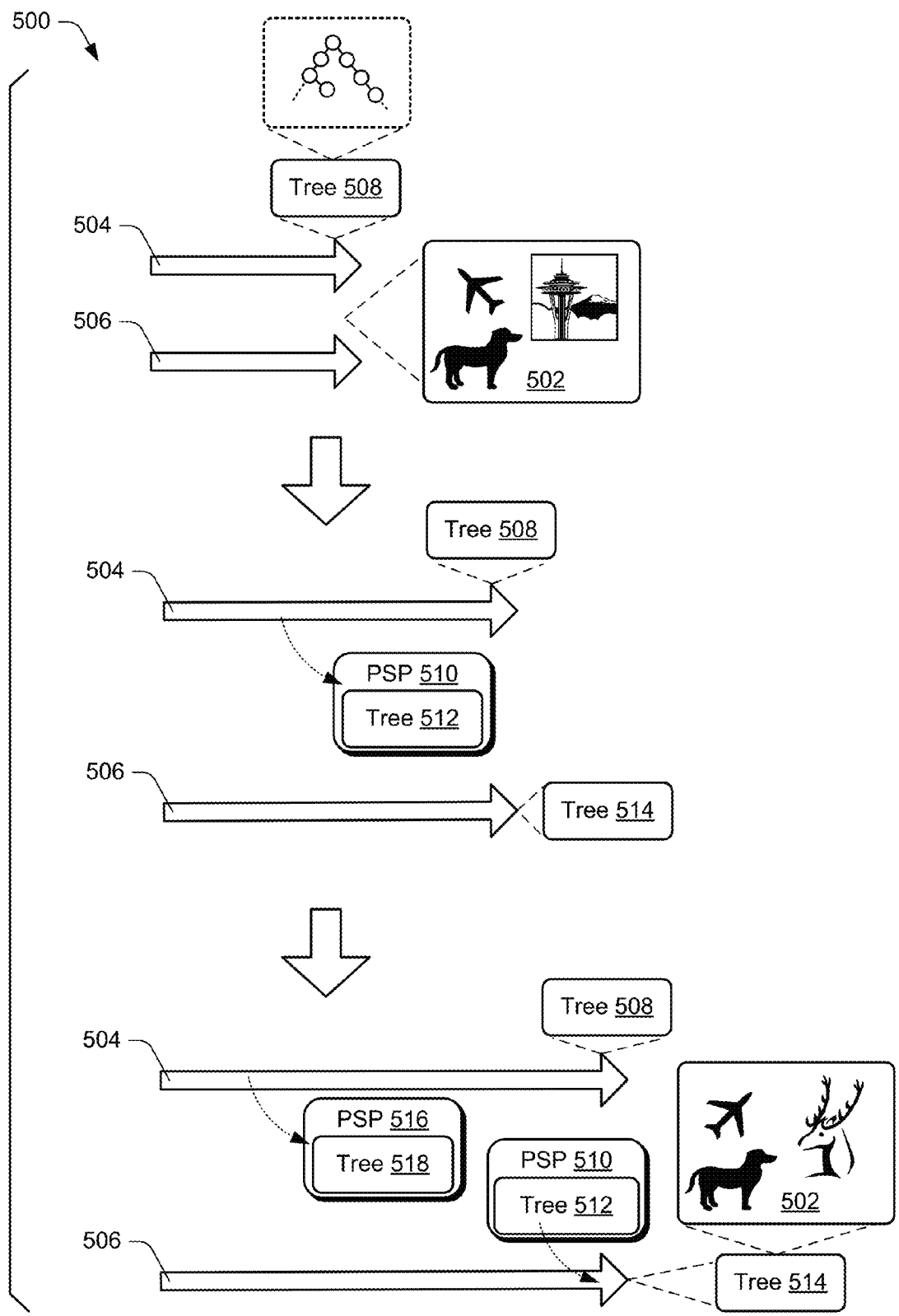
FIG. 5 illustrates an example implementation scenario in accordance with one or more embodiments.

FIG. 5 illustrates an example implementation scenario 500 in accordance with one or more embodiments. The scenario 500 includes a GUI 502, which is representative of various graphical elements that can be displayed. The GUI 502, for example, can represent an implementation of the GUI 116 discussed above with reference to the environment 100. The GUI 502 includes various visual elements, such as windows, graphics, text, images, and so forth.

The scenario 500 further includes a primary thread 504 and a render thread 506 for the GUI 502. Example details concerning primary threads and render threads are discussed above. The primary thread 504 is associated with a display tree 508, which is a data representation of the GUI 502. The display tree 508, for example, includes nodes that represent various visual elements of the GUI 502. For instance, the display tree 508 includes a parent node that represents the primary window of the GUI 502, as well as multiple child nodes that each represents a respective visual element of the GUI 502.

According to one or more embodiments, the display tree 508 is utilized by the primary thread 504 to perform various processing for the GUI 502. For instance, as various events occur that indicate modifications to visual elements of the GUI 502, the primary thread 504 modifies the display tree 508 accordingly. Thus, the display tree 508 is "owned" by the primary thread 504, and is updateable by the primary thread 504 to reflect various changes that are to be propagated to the GUI 502.

Proceeding to the center portion of the scenario 500, a PSP 510 is generated by the primary thread 504 according to various techniques discussed herein. The PSP 510 can be emitted by the primary thread 504, for example, in response to various events that change visual aspects of the GUI 502. The PSP 510 is associated with a display tree 512.

According to one or more embodiments, the display tree 512 represents a snapshot (e.g., copy) of the display tree 508 captured at a particular moment. For example, the primary thread 504 can modify one or more nodes of the display tree 508 in response to various events. The primary thread 504 can then generate a copy of the display tree 508 as the display tree 512. The primary thread 504 emits the PSP 510 that includes and/or is linked to the display tree 512. Thus, the display tree 512 corresponds to a state of the display tree 508 at a particular instance in time.

After the primary thread 504 emits PSP 510 with the display tree 512, the primary thread 504 can proceed with performing other tasks. For instance, the primary thread can make further modifications to the display tree 508 without affecting the display tree 512.

The scenario 500 further includes a display tree 514 maintained by the render thread 506. Generally, the display tree 514 is utilized by the render thread 506 for rendering visual aspects of the GUI 502. For instance, the render thread 506 reads from the display tree 514 to draw to the GUI 502. According to one or more embodiments, the display tree 514 was generated and/or modified based on a display tree from a previous PSP, e.g., a PSP received prior to the PSP 510. Thus, the display tree 514 is "owned" by the render thread 506. For example, in at least some embodiments the display tree 514 cannot be directly accessed or modified by the primary thread 504.

Proceeding to the lower portion of the scenario 500, the render thread 506 retrieves the PSP 510 and modifies the display tree 514 based on the display tree 512 associated with the PSP 510. The display tree 512, for instance, can indicate changes to one or more nodes of the display tree 514. Thus, the changes can be propagated from the display tree 512 to the display tree 514. Once the state of the display tree 514 is synchronized with the state of the display tree 512, the render thread 506 can proceed with rendering the GUI 502 based on the updated display tree 514.

Thus, visual processing applied by the primary thread 504 to the display tree 508 is propagated via the display tree 512 to the render thread 506, which then applies the visual processing to its own display tree 514.

Further illustrated in the lower portion of the scenario 500 is that the primary thread 504 emits a PSP 516 which includes a display tree 518. As with the display tree 512, the display tree 518 is a copy of the display tree 508 generated by the primary thread 504. The display tree 518, for example, includes changes to the state of the display tree 508 that have occurred subsequent to the display tree 512 having been generated.

When the render thread 506 is finished drawing to the GUI 502 from the current state of the display tree 514, the render thread 506 can retrieve the PSP 516 and can synchronize the display tree 514 with the display tree 518. The render thread 506 can then proceed with rendering the GUI 502 based on the updated display tree 514.

Thus, the scenario 500 illustrates that various states of a display tree can be maintained for a display region. For instance, with reference to the GUI 502, at least three states of a display tree for the GUI 502 can be maintained. The primary thread 504 maintains the display tree 508 to which it applies various changes to the visual state of the GUI 502. To enable changes to the visual state of the GUI 502 to be propagated to the render thread 506 and displayed, the state of the display tree 508 can be captured via an intermediate display tree that can be persisted for consumption by the render thread 506. For instance, the display trees 512, 518 represent snapshots of the display tree 508 captured at different states of the display tree 508. Further, the render thread 506 maintains the display tree 514 which it synchronizes to the intermediate display trees and reads from for rendering to the GUI 502.

In at least some embodiments, PSPs can be employed to propagate changes to a display tree without requiring entire copies of a display tree to be generated. For instance, consider the following example scenario.

Figure 6:
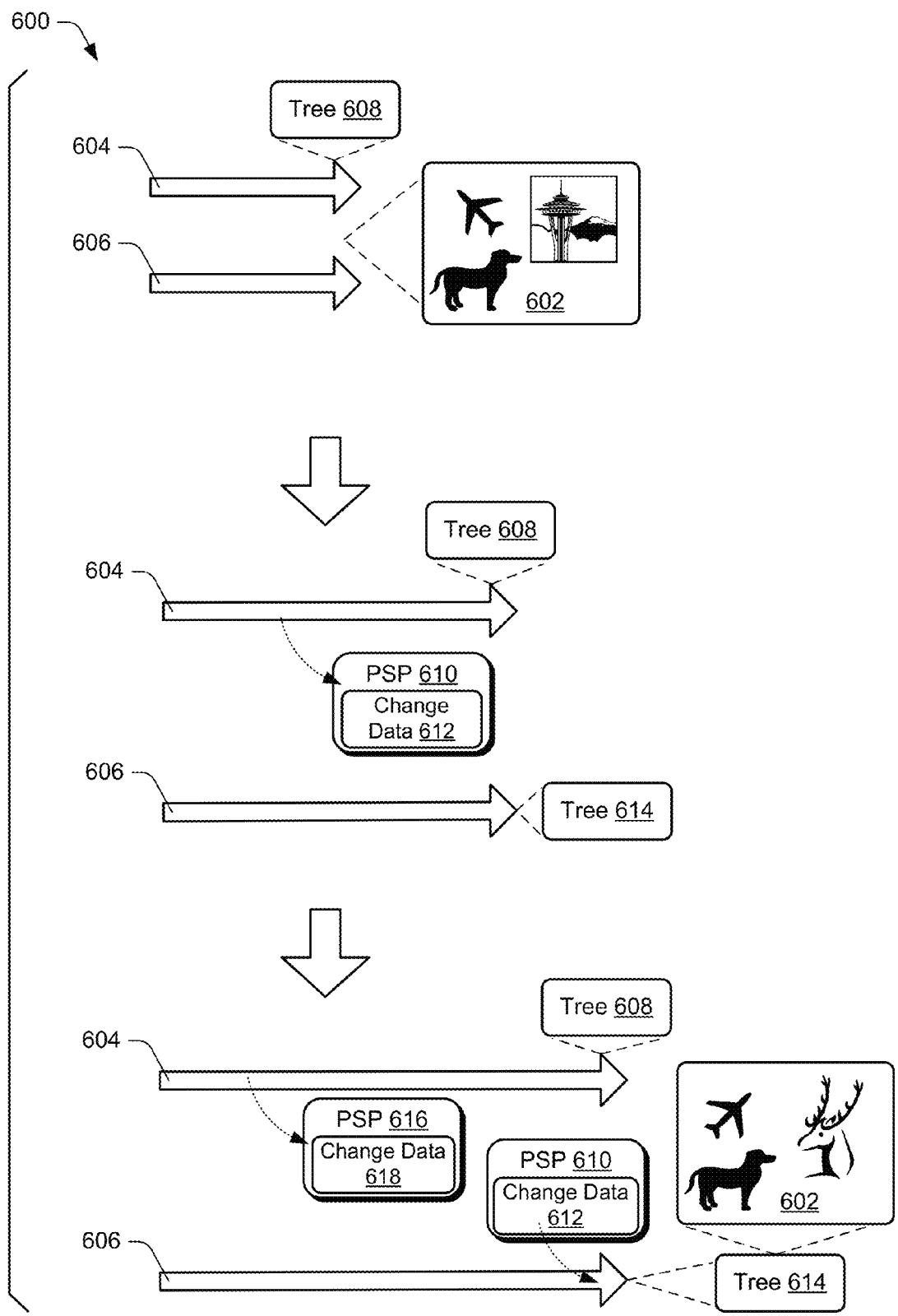
FIG. 6 illustrates an example implementation scenario in accordance with one or more embodiments.

FIG. 6 illustrates an example implementation scenario 600 in accordance with one or more embodiments. The scenario 600 includes a GUI 602, which is representative of various graphical elements that can be displayed. The GUI 602, for example, can represent an implementation of the GUI 116 discussed above with reference to the environment 100. The GUI 602 includes various visual elements, such as windows, graphics, text, images, and so forth.

The scenario 600 further includes a primary thread 604 and a render thread 606 for the GUI 602. Example details concerning primary threads and render threads are discussed above. The primary thread 604 is associated with a display tree 608, which is a data representation of the GUI 602.

Proceeding to the center portion of the scenario 600, a PSP 610 is generated by the primary thread 604 according to various techniques discussed herein. The PSP 610 can be emitted by the primary thread 604, for example, in response to various events that change visual aspects of the GUI 602.

The PSP 610 includes change data 612, which represents changes to the display tree 608 that have occurred. For example, the primary thread 604 can modify one or more nodes of the display tree 608 in response to various events. Other types of changes may also be made, such as adding nodes, deleting nodes, rearranging nodes, and so forth. The primary thread 604 can then generate the change data 612, which specifies the changes that are made to the display tree 608. The primary thread 604 emits the PSP 610 that includes and/or is linked to the change data 612. According to various embodiments, the change data 612 corresponds to changes to the display tree 608 that have occurred since a previous PSP was emitted. Thus, the PSP 612 does not include an entire copy of the display tree 608.

After the primary thread 604 emits the PSP 610 with the change data 612, the primary thread 604 can proceed with performing other tasks. For instance, the primary thread can make further modifications to the display tree 608 without affecting the change data 612.

The scenario 600 further includes a display tree 614 maintained by the render thread 606. Generally, the display tree 614 is utilized by the render thread 606 for rendering visual aspects of the GUI 602. The display tree 614, for instance, corresponds to a version of the display tree 608 generated based on a previous PSP.

Proceeding to the lower portion of the scenario 600, the render thread 606 retrieves the PSP 610 and modifies the display tree 614 based on the change data 612. Thus, the changes indicated in the change data 612 can be applied to the display tree 614. The render thread 606 can then proceed with rendering the GUI 602 based on the updated display tree 614.

According to various embodiments, the PSP 610 persists until the render thread 606 is finished reading data from and/or otherwise utilizing the PSP 610. For instance, the PSP 610 represents a valid state of the display tree 608 that remains valid and usable by the render thread 606 until the render thread 606 releases the PSP 610, and/or moves on to processing a subsequent PSP. In at least some embodiments, after the render thread 606 is finished processing the PSP 610, a memory address and/or addresses for the PSP 610 can be released to be used for other purposes, e.g., a subsequent PSP.

Thus, visual processing applied by the primary thread 604 to the display tree 608 is propagated via the change data 612 to the render thread 606, which then applies the visual processing to its own display tree 614.

Further illustrated in the lower portion of the scenario 600 is that the primary thread 604 emits a PSP 616 which includes change data 618. The change data 618, for example, indicates changes to the state of the display tree 608 that have occurred subsequent to the primary thread 604 emitting the PSP 610.

When the render thread 606 is finished drawing to the GUI 602 from the current state of the display tree 614, the render thread 606 can retrieve the PSP 616 and can synchronize the display tree 614 based on the change data 618. The render thread 606 can then proceed with rendering the GUI 602 based on the updated display tree 614.

Thus, the scenario 600 illustrates that PSPs can be employed to share changes in a visual state of a GUI among threads without generating multiple copies of a display tree for the GUI. Further, the lifetime of a PSP can be managed to enable a particular state of a display tree to be persisted for a render thread, while a primary thread that generated the PSP performs other processing.

While the scenarios presented above are discussed with reference to rendering scenarios, this is not intended to be limiting. For example, synchronization points can be used to propagate state information between a variety of different threads as part of a variety of different processes and/or tasks.

In at least some embodiments, a GUI may include certain elements which cannot or must not be rendered separately on a different thread, e.g., for reasons of economy or correctness. Therefore, such embodiments can choose to process a PSP on a primary thread until they again deem it appropriate to use a render thread for improved performance. Further, such embodiments may choose to defer creation of a render thread, pause it, or shut it down depending on availability of resources.

Having discussed some example implementation scenarios, consider now a discussion of some example procedures in accordance with one or more embodiments.

Example Procedures

The following discussion describes some example procedures for synchronization points for state information in accordance with one or more embodiments. The example procedures may be employed in the environment 100 of FIG. 1, the system 900 of FIG. 9, and/or any other suitable environment.

Figure 7:
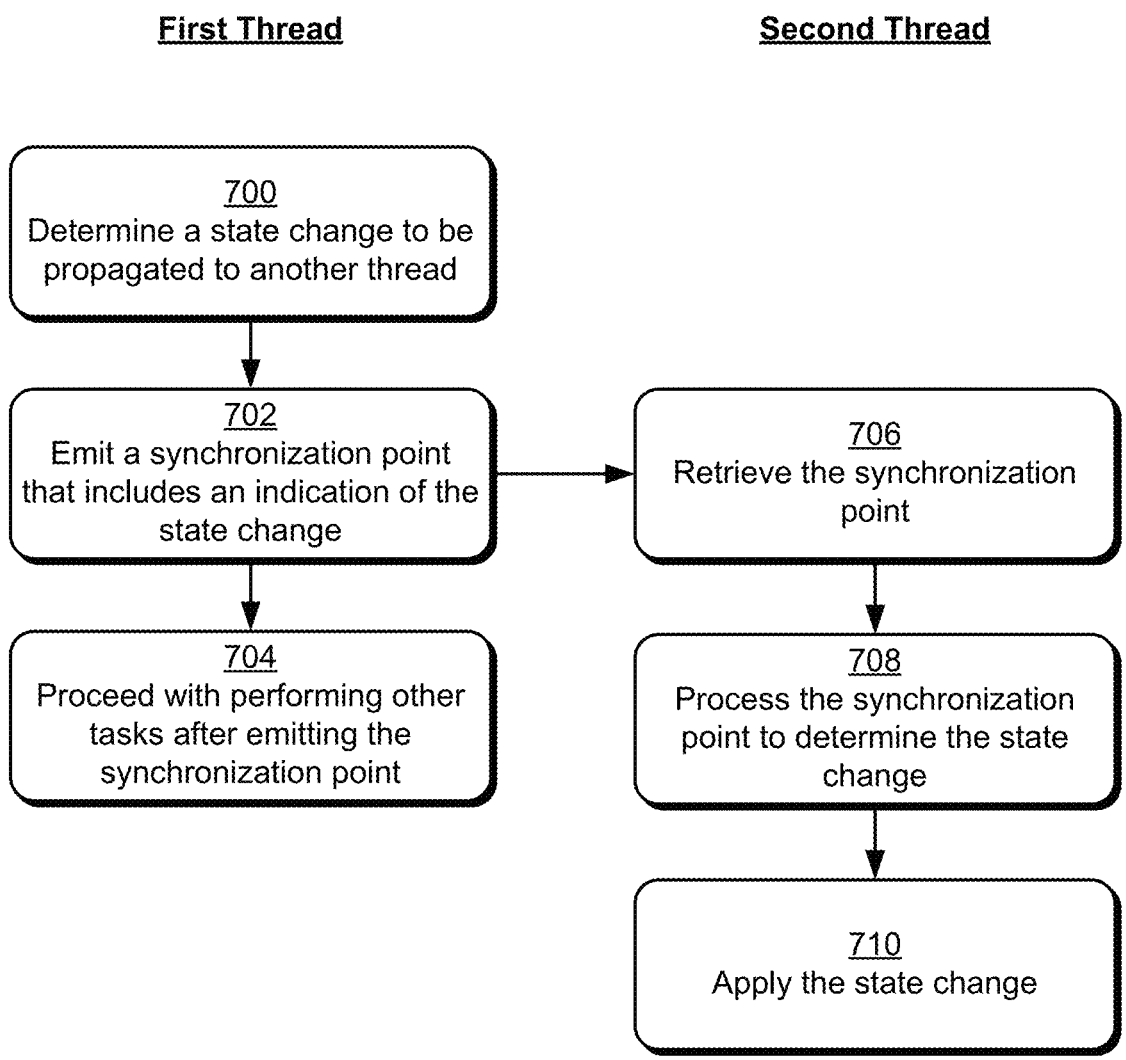
FIG. 7 is a flow diagram that describes steps in a method in accordance with one or more embodiments.

FIG. 7 is a flow diagram that describes steps in a method in accordance with one or more embodiments. The method is discussed with reference to steps associated with a first thread and steps associated with a second thread. The first thread and the second thread can be associated with a variety of different processes and/or tasks.

Step 700 determines a state change to be propagated to another thread. As discussed above, the state change can relate to a change in a visual aspect of a graphical element, such as a portion of the GUI. A variety of other types of state changes, however, can be propagated according to various embodiments. A state change, for example, can relate to a variety of different processes and/or resources associated with a computing device.

Step 702 emits a synchronization point that includes an indication of the state change. With reference to a change to visual aspect, for example, the synchronization point can include and/or identify data that indicates how the visual aspect is to be changed. For instance, the synchronization point can include one or more portions of the display tree for a graphical element that define how the graphical element is to be rendered and displayed. Alternatively and/or additionally, the synchronization point can identify where data for the state change can be found, such as a memory address.

In at least some embodiments, emitting a synchronization point can include placing the synchronization point in a synchronization point queue. For instance, if one or more other synchronization points remain to be processed, the synchronization point can be placed behind the other synchronization points in a synchronization point queue such that the different synchronization points can be processed in order.

Step 704 proceeds with performing other tasks after emitting the synchronization point. The first thread, for example, can continue executing other tasks, such as generating additional synchronization points. Thus, the first thread need not wait until the synchronization point is consumed by the second thread to continue processing.

Step 706 retrieves the synchronization point. The second thread, for example, can retrieve the synchronization point from a synchronization point queue.

Step 708 processes the synchronization point to determine the state change. The state change, for example, can relate to a change in a visual state of a graphical element, such as a GUI. As referenced above, however, embodiments are not limited to state changes in visual elements, and can refer to state changes in a variety of different processes, resources, and so on.

Step 710 applies the state change. The state change, for example, can be applied to a process and/or resource associated with the synchronization point. For instance, the state change can be applied to change the visual appearance of a graphical element.

Figure 8:
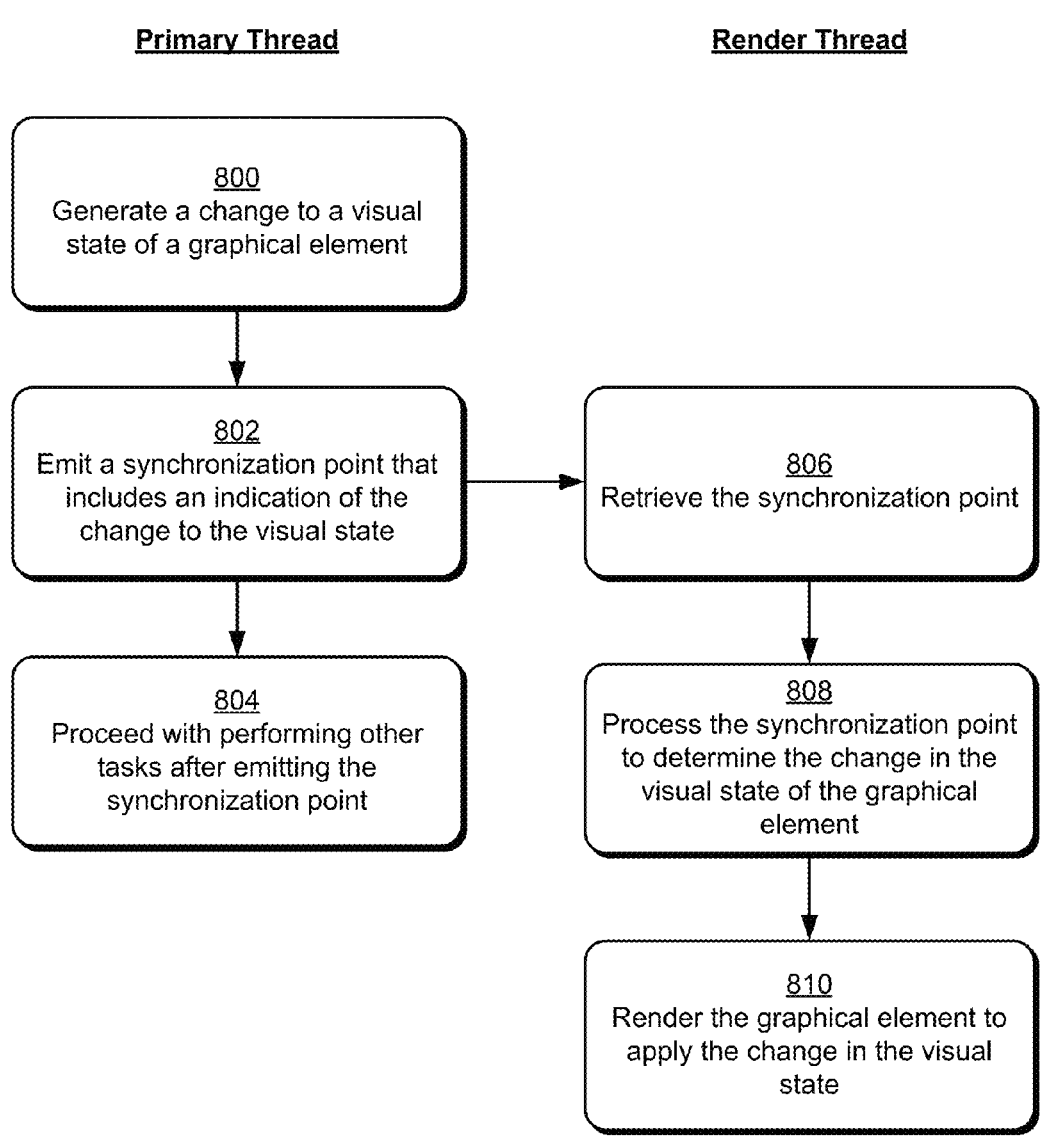
FIG. 8 is a flow diagram that describes steps in a method in accordance with one or more embodiments.

FIG. 8 is a flow diagram that describes steps in a method in accordance with one or more embodiments. The method is discussed with reference to steps associated with a primary thread, and steps associated with a render thread. Example embodiments and functionalities of a primary thread and a render thread are discussed above.

Step 800 generates a change to a visual state of a graphical element. For instance, the primary thread can perform various types processing that causes a change to a graphical element, such as a visual change to a GUI. As detailed above, the primary thread can make modifications to a display tree maintained by the primary thread.

Step 802 emits a synchronization point that includes an indication of the change to the visual state. The synchronization point, for example, can include data that characterizes the change, and/or can identify where the data may be retrieved. For instance, the synchronization point can include and/or identify a version of a display tree maintained by the primary thread.

Step 804 proceeds with performing other tasks after emitting the synchronization point. The primary thread, for example, need not wait for the render thread to consume the synchronization point before proceeding with other processing tasks.

Step 806 retrieves the synchronization point. The render thread, for instance, can retrieve the synchronization point from a synchronization point queue.

Step 808 processes the synchronization point to determine the change in the visual state of the graphical element. For instance, a display tree included with and/or identified by the synchronization point can be inspected.

Step 810 renders the graphical element to apply the change in the visual state. The render thread, for example, can apply the changes to the visual state to a display tree maintained by the render thread. The render thread can then render the graphical element based on the updated display tree.

While embodiments are discussed herein with reference to interaction between two different threads, this is presented for purpose of example only. For instance, in at least some embodiments multiple different threads can produce synchronization points and can emit the synchronization points for processing by a particular thread. In a GUI rendering scenario, for example, multiple different threads can produce synchronization points that specify changes to visual aspects of the GUI. The synchronization points can be emitted by the different threads for consumption by a rendering thread.

Having discussed some example procedures, consider now a discussion of an example system and device in accordance with one or more embodiments.

Example System and Device

Figure 9:
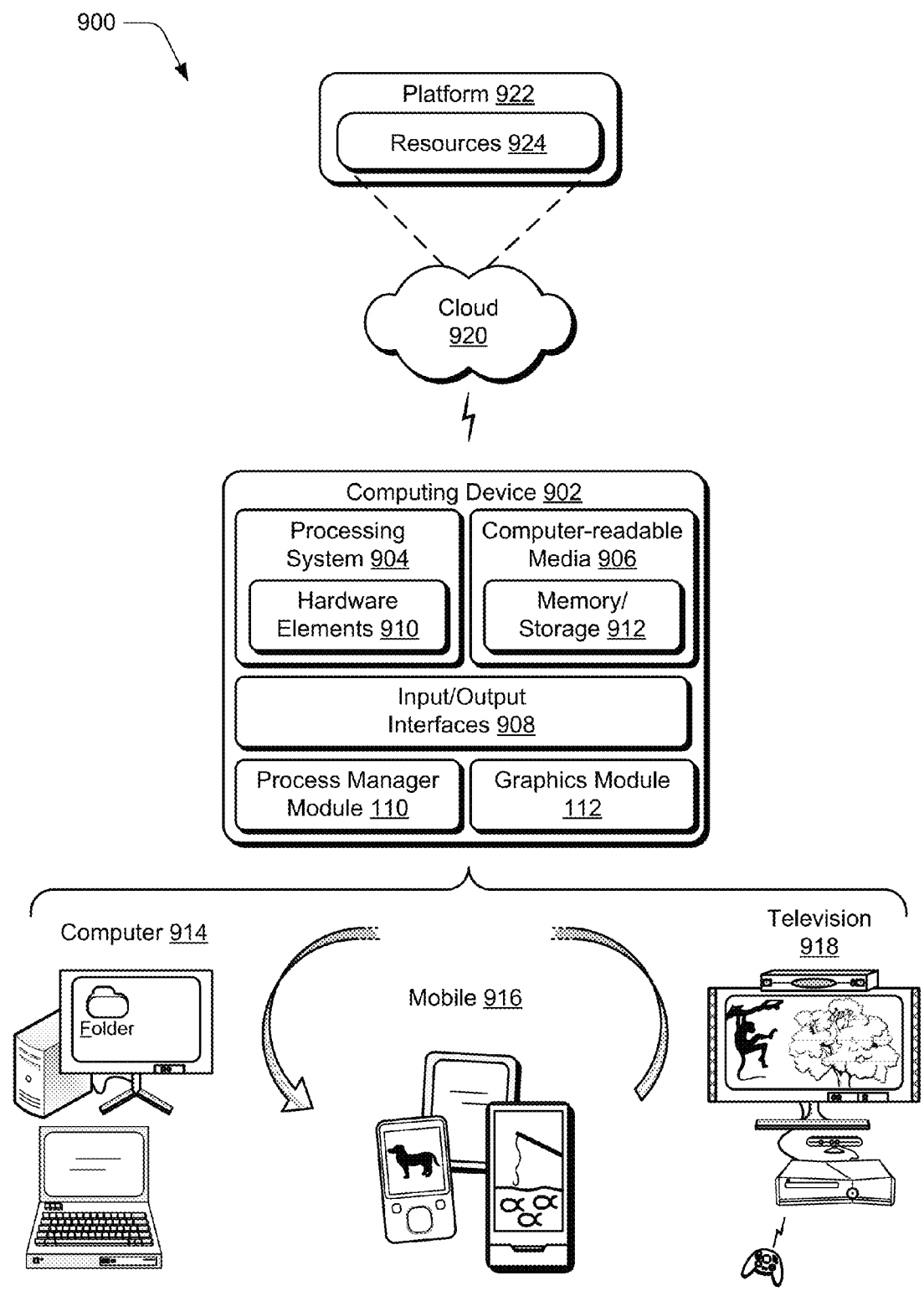
FIG. 9 illustrates an example system and computing device as described with reference to FIG. 1, which are configured to implement embodiments of techniques described herein.

FIG. 9 illustrates an example system generally at 900 that includes an example computing device 902 that is representative of one or more computing systems and/or devices that may implement various techniques described herein. For example, the computing device 102 discussed above with reference to FIG. 1 can be embodied as the computing device 902. The computing device 902 may be, for example, a server of a service provider, a device associated with the client (e.g., a client device), an on-chip system, and/or any other suitable computing device or computing system.

The example computing device 902 as illustrated includes a processing system 904, one or more computer-readable media 906, and one or more Input/Output (I/O) Interfaces 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware element 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 906 is illustrated as including memory/storage 912. The memory/storage 912 represents memory/storage capacity associated with one or more computer-readable media. The memory/storage 912 may include volatile media (such as random access memory (RAM)) and/or nonvolatile media (such as read only memory (ROM), Flash memory, optical disks, magnetic disks, and so forth). The memory/storage 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Thus, computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 910 and computer-readable media 906 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of modules that are executable by the computing device 902 as software may be achieved at least partially in hardware, e.g., through use of computer-readable storage media and/or hardware elements 910 of the processing system. The instructions and/or functions may be executable/operable by one or more articles of manufacture (for example, one or more computing devices 902 and/or processing systems 904) to implement techniques, modules, and examples described herein.

As further illustrated in FIG. 9, the example system 900 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 900, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 902 may assume a variety of different configurations, such as for computer 914, mobile 916, and television 918 uses. Each of these configurations includes devices that may have generally different constructs and capabilities, and thus the computing device 902 may be configured according to one or more of the different device classes. For instance, the computing device 902 may be implemented as the computer 914 class of a device that includes a personal computer, desktop computer, a multi-screen computer, laptop computer, netbook, and so on.

The computing device 902 may also be implemented as the mobile 916 class of device that includes mobile devices, such as a mobile phone, portable music player, portable gaming device, a tablet computer, a multi-screen computer, and so on. The computing device 902 may also be implemented as the television 918 class of device that includes devices having or connected to generally larger screens in casual viewing environments. These devices include televisions, set-top boxes, gaming consoles, and so on.

The techniques described herein may be supported by these various configurations of the computing device 902 and are not limited to the specific examples of the techniques described herein. For example, functionalities discussed with reference to the process manager module 110 and/or the graphics module 112 may be implemented all or in part through use of a distributed system, such as over a "cloud" 920 via a platform 922 as described below.

The cloud 920 includes and/or is representative of a platform 922 for resources 924. The platform 922 abstracts underlying functionality of hardware (e.g., servers) and software resources of the cloud 920. The resources 924 may include applications and/or data that can be utilized while computer processing is executed on servers that are remote from the computing device 902. Resources 924 can also include services provided over the Internet and/or through a subscriber network, such as a cellular or Wi-Fi network.

The platform 922 may abstract resources and functions to connect the computing device 902 with other computing devices. The platform 922 may also serve to abstract scaling of resources to provide a corresponding level of scale to encountered demand for the resources 924 that are implemented via the platform 922. Accordingly, in an interconnected device embodiment, implementation of functionality described herein may be distributed throughout the system 900. For example, the functionality may be implemented in part on the computing device 902 as well as via the platform 922 that abstracts the functionality of the cloud 920.

Discussed herein are a number of methods that may be implemented to perform techniques discussed herein. Aspects of the methods may be implemented in hardware, firmware, or software, or a combination thereof. The methods are shown as a set of steps that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

CONCLUSION

Techniques for synchronization points for state information are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A system comprising:
   at least one processor; and
   one or more computer-readable storage media including instructions stored thereon that, responsive to execution by the at least one processor, cause the system to perform operations including:
     executing a first thread to generate a change to a visual state of a graphical element, the graphical element represented by a corresponding node in a first display tree of the first thread, the first thread further configured to emit a synchronization point that includes an indication of the change to the visual state and that persists in a valid state at least until a second thread retrieves and processes the synchronization point to update the visual state of the graphical element in a corresponding node in a second display tree of the second thread; and
     executing the second thread to process the synchronization point to determine the change to the visual state, update the visual state of the graphical element in the second display tree of the second thread, and to render the graphical element to apply the change to the visual state based on the updated visual state of the graphical element in the second display tree of the second thread.

2. A system as recited in claim 1, wherein said executing the first thread comprises executing the first thread via a first processor core, and where said executing the second thread comprises executing the second thread via a second processor core.

3. A system as recited in claim 1, wherein the graphical element comprises at least a portion of a web document generated by a web platform application.

4. A system as recited in claim 1, wherein said executing the first thread comprises adding the synchronization point to a synchronization point queue, and wherein said executing the second thread comprises retrieving the synchronization point from the synchronization point queue prior to processing the synchronization point.

5. A system as recited in claim 4, wherein said executing the second thread comprises retrieving the synchronization point from the synchronization point queue subsequent to retrieving and processing one or more other synchronization points from the synchronization point queue.

6. A system as recited in claim 4, wherein said executing the second thread comprises retrieving and processing synchronization points from the synchronization point queue in an order in which the synchronization points are added to the synchronization point queue.

7. A system as recited in claim 1, wherein the change to the visual state is based on user input to the graphical element.

8. A system as recited in claim 1, wherein the operations further include executing the first thread to perform further processing after the synchronization point is emitted and without waiting for the second thread to process the synchronization point.

9. A system as recited in claim 1, wherein:
said executing the first thread comprises modifying a version of the first display tree maintained by the first thread for the graphical element to reflect the change to the visual state, and associating a copy of the modified version of the first display tree with the synchronization point; and
said executing the second thread comprises propagating state information from the copy of the modified version of the display tree to a version of the second display tree maintained by the second thread, and rendering the graphical element based on the version of the second display tree maintained by the second thread.

10. One or more computer-readable storage media comprising instructions stored thereon that, responsive to execution by a computing device, cause the computing device to perform operations comprising:
receiving input to a graphical user interface (GUI);
generating via a primary thread one or more changes to a visual state of the GUI based on the user input, the GUI represented by a first display tree of the primary thread, the primary thread further configured to emit a synchronization point that includes an indication of the one or more changes to the visual state of the GUI and that remains in a valid state while the primary thread performs other processing and at least until a render thread updates the visual state of the GUI in a second display tree of the render thread based on the one or more changes; and
processing the synchronization point via the render thread to determine the one or more changes to the visual state, apply the changes to the second display tree of the render thread to generate an updated display tree for the GUI, and render the GUI based on the one or more changes to the visual state.

11. One or more computer-readable storage media as recited in claim 10, wherein the input comprises touch input from a user to perform one or more of scrolling or zooming of at least one portion of the GUI.

12. One or more computer-readable storage media as recited in claim 10, wherein the primary thread is executed via a first processor core, and wherein the render thread is executed via a second processor core.

13. One or more computer-readable storage media as recited in claim 10, wherein the GUI comprises a web document.

14. One or more computer-readable storage media as recited in claim 10, wherein said emitting comprises adding the synchronization point to a synchronization point queue, and wherein said processing comprises retrieving via the render thread the synchronization point from the synchronization point queue.

15. One or more computer-readable storage media as recited in claim 14, wherein the synchronization point queue includes one or more other synchronization points, and wherein the operations comprise processing via the render thread synchronization points from the synchronization point queue in an order in which the synchronization points are added to the synchronization point queue.

16. One or more computer-readable storage media as recited in claim 10, wherein:
said generating comprises modifying via the primary thread a version of the first display tree maintained by the primary thread for the GUI to reflect the one or more changes to the visual state, and associating a copy of the modified version of the display tree with the synchronization point; and
said processing comprises propagating via the render thread state information from the copy of the modified version of the first display tree to a version of the second display tree maintained by the render thread, and rendering the GUI based on the second version of the display tree maintained by the render thread.

17. A computer-implemented method, comprising:
executing via a first processor core a first thread to generate one or more changes to a visual state of a graphical user interface (GUI), and to emit a synchronization point that includes an indication of the one or more changes to the visual state of the GUI represented as changes to a first display tree of the first thread for the GUI, the synchronization point remaining in a valid state at least until another thread processes the synchronization point; and
executing via a second processor core a second thread to process the synchronization point to determine the one or more changes to the visual state of the GUI, apply the changes to a second display tree of the second thread to generate an updated display tree for the GUI, and to render the GUI based on the updated display tree.

18. A method as described in claim 17, wherein the GUI comprises a web document, and wherein the first thread and the second thread are managed by a graphics module for a web platform application that generates the web document.

19. A method as described in claim 17, wherein:
said executing the first thread comprises modifying a version of the first display tree maintained by the first thread for the GUI to reflect the change to the visual state, and associating a copy of the modified version of the first display tree with the synchronization point; and
said executing the second thread comprises propagating state information from the copy of the modified version of the display tree to a version of the second display tree maintained by the second thread, and rendering the GUI based on the version of the second display tree maintained by the second thread.

20. A method as described in claim 17, further comprising executing the first thread to perform other tasks subsequent to emitting the synchronization point, and without waiting for the second thread to process the synchronization point.

* * * * *